United States Patent
Warrender et al.

(10) Patent No.: US 7,867,954 B2
(45) Date of Patent: Jan. 11, 2011

(54) PUMICE CONTAINING COMPOSITIONS FOR CEMENTING A WELL

(75) Inventors: Neil Warrender, Calgary (CA); Amir Mahmoudkhani, Calgary (CA); Nga Tu Huynh, Calgary (CA); Charles Sylvestre, Calgary (CA)

(73) Assignee: Sanjel Limited Partnership, Calgary, Alberta (CA)

( * ) Notice: Subject to any disclaimer, the term of this patent is extended or adjusted under 35 U.S.C. 154(b) by 126 days.

(21) Appl. No.: 12/256,081

(22) Filed: Oct. 22, 2008

(65) Prior Publication Data

US 2009/0105099 A1 Apr. 23, 2009

Related U.S. Application Data

(60) Provisional application No. 60/981,678, filed on Oct. 22, 2007.

(51) Int. Cl.
*C09K 17/00* (2006.01)
*C04B 40/00* (2006.01)
*E21B 33/13* (2006.01)

(52) U.S. Cl. ............... 507/269; 106/819; 166/285; 166/292; 166/293

(58) Field of Classification Search ............... 507/269; 106/819; 166/285, 292, 293
See application file for complete search history.

(56) References Cited

U.S. PATENT DOCUMENTS

| | | | |
|---|---|---|---|
| 5,223,035 A | 6/1993 | Hopkins et al. | |
| 5,292,366 A | 3/1994 | Miceli | |
| 5,346,012 A | 9/1994 | Heathman et al. | |
| 5,968,257 A | 10/1999 | Ahrens | |
| 6,402,830 B1 | 6/2002 | Schaffer | |
| 7,156,173 B2 | 1/2007 | Mueller | |
| 2004/0107877 A1 | 6/2004 | Getzlaf et al. | |
| 2004/0112600 A1 | 6/2004 | Luke et al. | |
| 2004/0188092 A1 | 9/2004 | Santra et al. | |
| 2006/0054319 A1 | 3/2006 | Fyten et al. | |
| 2006/0065399 A1 | 3/2006 | Luke et al. | |

FOREIGN PATENT DOCUMENTS

| | | |
|---|---|---|
| CA | 2071722 | 11/2000 |
| CA | 2438654 | 9/2003 |
| EP | 1339653 | 10/2006 |

OTHER PUBLICATIONS

Wikipedia, The Free Encyclopedia; Fly Ash, Oct. 18, 2007; pp. 1-6; Internet article.
Lura, Pietro et al.; Measurement of Water Transport from Saturated Pumice Aggregates to Hardening Cement Paste; Advances in Cement and Concrete; Proceedings; Engineering Conferences International; Aug. 10-14, 2003; pp. 89-99; National Institute of Standards and Technology.
Sveindottir, Edda L. et al.; LWAC Material Properties State-of-the-Art; EuroLightCon; Economic Design and Construction with Light Weight Concrete; Dec. 1998; Document BE96-3942/R2; European Union—Brite EuRam III.
Schlumberger; Low-Density Slurry System That Reduces Multiple-Stage Cement Operations; 2005; LiteCrete.
Pumex S.p.A.; Lipari Pumice for Use in Oil Well Cement.
U.S. Grout LLC; Type V Premium Grout Product Data.

*Primary Examiner*—Timothy J. Kugel
(74) *Attorney, Agent, or Firm*—Bennett Jones LLP

(57) ABSTRACT

A cement composition comprises fine pumice particles, for use in cementing subterranean wells, and oil and gas wells in particular. The pumice containing cement blends feature enhanced compressive strength, and favorable compressive strength to Young's Modulus ratios. Lightweight cement blends containing pumice, and their use in cementing oil and gas wells are also described.

17 Claims, 8 Drawing Sheets

Graph 1: Compressive strength data for 1400 kg/m³ cement A blends

Graph 2: Compressive strength data for 1400 kg/m³ cement G blends

Graph 3: Compressive strength for 1750 kg/m³ cement G blends after 48 hours varying pumice content

Graph 4: Compressive strength for 1750 kg/m$^3$ cement A blends after 48 hours varying pumice content

Graph 5: Ratio of compressive strength to Young's Modulus

PUMICE CONTAINING COMPOSITIONS FOR CEMENTING A WELL

CROSS REFERENCE TO RELATED APPLICATIONS

This is a nonprovisional application claiming the priority benefit of U.S. Provisional Application No. 60/981,678, filed on Oct. 22, 2007 entitled "Pumice Containing Compositions for Cementing a Well".

FIELD OF INVENTION

The invention relates to cement compositions containing pumice used for the construction of oil and gas wells.

BACKGROUND

In the drilling and completion of an oil or gas well, a cement composition is introduced to the well bore for cementing pipe string or casing in place. In this process, known as "primary cementing", the cement composition is pumped into the annular space between the walls of the well bore and the casing. The cement composition sets in the annular space, supporting and positioning the casing, and forming a substantially impermeable barrier, or cement sheath, which isolates the well bore from subterranean zones.

Changes in pressure or temperature in the well bore over the life of the well can produce stress on the cement composition, as can activities undertaken in the well bore, such as pressure testing, well completion operations, hydraulic fracturing, and hydrocarbon production. When these imposed stresses exceed the limiting strength of the cement, the cement sheath will fail and no longer provide zonal isolation. Compromised zonal isolation is highly undesirable, and necessitates remedial operations to be undertaken.

Due to its low tensile strength, neat cement is an undesirable material for use where there is a chance of expansive or tensile stresses developing in the well bore. Generally, a cement composition that has properties of elasticity and ductility, while retaining sufficient compressive strength and maintaining low permeability, is desirable.

Conventional cement is energy intensive. It is estimated that the cement industry produces approximately 5% of worldwide greenhouse gas (GHG) emissions. Total $CO_2$ emissions from cement production range from 0.84 to 1.15 kg/kg clinker depending on production process and choice of raw materials. Given the limitations involved in reducing $CO_2$ emissions from alternative raw materials and fuels, or by improving kiln efficiency, probably the most effective means of achieving significant reduction lies in the replacement of Portland cement clinker by other suitable materials. Supplementary cementitious materials such as fly ash, pozzolans, silica fume and metakaolin are commonly being used. However, these supplements have disadvantages. For example, the production of silica fume is also energy intensive and therefore it is an expensive product. Silica fume is also difficult and hazardous to handle.

Pumice cement was used by the ancient Greek and Roman and structures such as the Pantheon and the Coliseum were built with pumice cement. As pumice is inert and brittle, it can be used as an abrasive material for various purposes, including hand soaps, grill cleaners and skin removal products. Due to the cellular structure of pumice, which allows porosity but not permeability, it can be used as an absorbent (e.g., as a soil substitute and pesticide carrier). Pumice can also be ground into a powder to be used as filler in paints and asphalt mixes.

Pumice has thermal insulation properties and compressive strength properties, which are useful in construction. Although pumice has been used in the concrete industry as a natural pozzolan, there is no report of its use in oil and gas industry for cementing oil and gas wells, as a result of the different properties desired for the materials used in the two industries.

There is a need in the art for a pumice-containing cement composition which is useful for cementing oil and gas wells.

SUMMARY OF INVENTION

The invention relates to cement compositions containing pumice, their method of manufacture and their use in the cementing of subterranean wells, such as oil and gas wells. Pumice is a natural pozzolan and widely available in several countries including Canada and the United States and does not require energy intensive calcinations. Therefore, use of pumice is more efficient in reducing $CO_2$ when compared to calcined clays and shales or metakaolin that are pre-treated by calcinations. The binary (cement+pumice) and ternary (cement+pumice+fly ash) cement blends described herein can reduce $CO_2$ emission by up to 60% of the original cement blend.

In one aspect, the invention relates to an oil and gas well cement composition containing pumice in an amount of about 5% to about 100% by weight. In a preferred embodiment, the pumice comprises 10% to about 30% by weight, and in a more preferred embodiment the pumice content is about 15% to about 25% by weight. The remainder of the composition comprises cement, and optionally may contain fly ash. The cement is preferably API Portland cement. In one embodiment, the mixture of cement and fly ash is in a ratio of about 100:0 to about 50:50 by weight, and preferably about 80:20 and more preferably about 70:30.

In one embodiment, the cement composition further contains additives. In one preferred embodiment, the additives are present in the range of about 0.1-3.0% (wt). In another preferred embodiment, the additives are present in a range of about 0.5-1.5% (wt), more preferably, the additives are present in about 0.75-1.25% (wt).

In another aspect, the invention relates to a method of cementing a subterranean well using a cement composition containing about 5-100% (wt) of pumice and about 0-95% (wt) of a mixture of API Portland cement and fly ash in a ratio of from 100:0 to 50:50 by weight respectively.

BRIEF DESCRIPTION OF THE FIGURES

Embodiments of the invention may now be described with reference to the following figures.

DETAILED DESCRIPTION OF THE INVENTION

The invention relates to cement compositions containing pumice, and their use in the construction of subterranean wells, such as wells drilled into petroleum producing formations.

When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims. As used herein, a "cement blend" is synonymous with "cement composition".

Figure 1A:
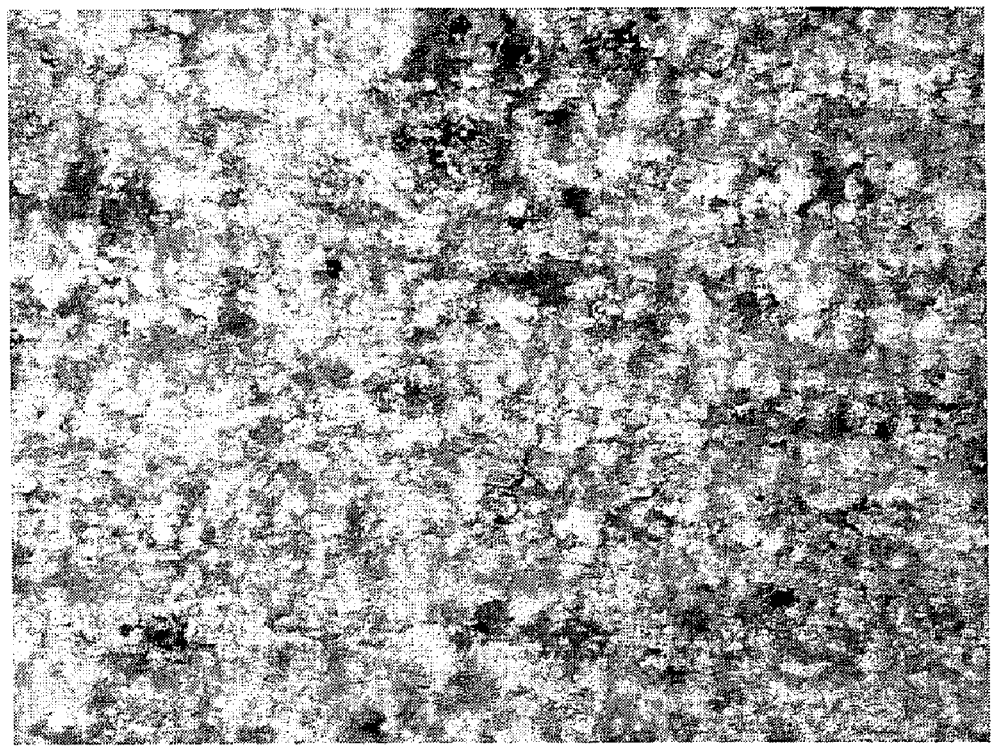
FIG. 1A shows optical micrographs of pumice grains at 50×.
Figure 1B:
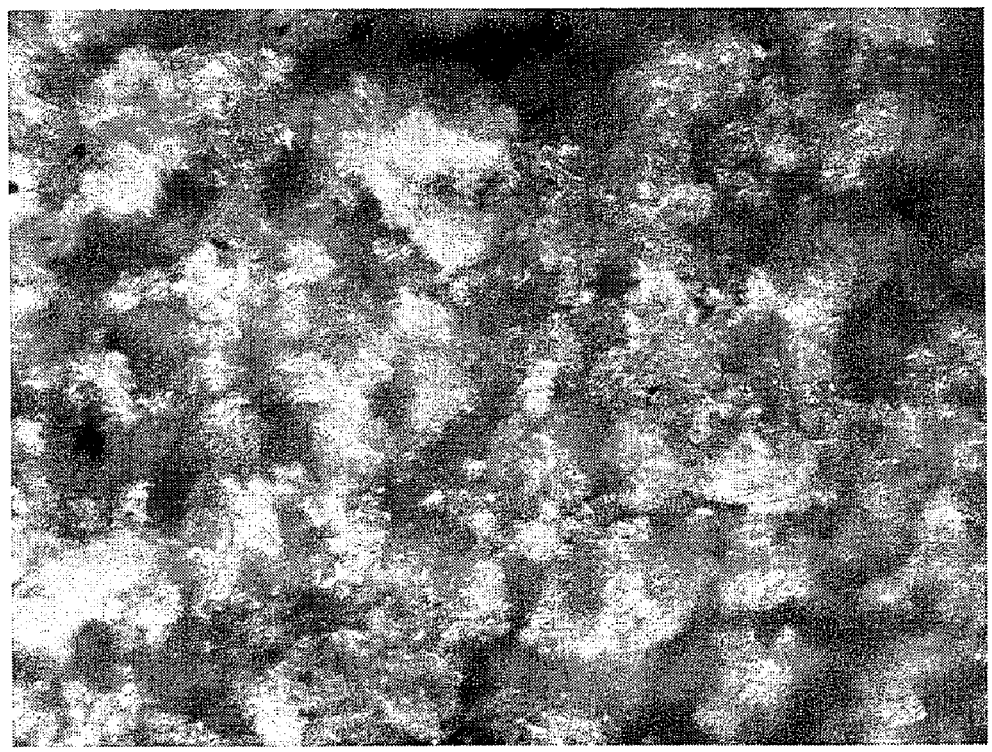
FIG. 1B shows optical micrographs at 100×(b) magnifications, both showing vesicular texture of the material.

Pumice is a volcanic glass that is formed when lava with high silica content and gas bubbles solidify after an explosive eruption. Most pumice is silicic, ranging from 65% to 70% $SiO_2$ or dacitic to rhyolitic in composition. Pumice typically occurs as an ash-fall shower located directly around the vent or in a pattern reflecting wind direction. During an explosive eruption, volcanic gases dissolved in the liquid portion of magma also expand rapidly to create a foam or froth; in the case of pumice, the liquid part of the froth quickly solidifies to glass around the glass bubbles. Pumice is usually described as a cellular, glassy lava, with each cell isolated from the next by a layer of glass. Pumice is usually found floating on the surface of a lava flow. It is frequently composed of parallel fibers or threads with intervening spaces to form a delicate structure. The texture of pumice is determined by the viscosity of the lava, the quantity of water vapor and gas, and the rate of cooling. Finer-grained pumice (with large amounts of gas) is referred to as pumicite while coarse-grained pumice (with fewer air spaces) is referred to as scoria. As used herein, "pumice" shall include both pumicite and scoria. Because of its chambers of air, pumice has a very low density and can float. Some of the properties of pumice are disclosed in Tables 1 and 2. Optical micrographs of pumice are shown in FIG. 1.

TABLE 1

Physical properties of volcanic pumice

| Rock Structure: | Vesicular |
| --- | --- |
| Hardness: | 5-5.5 Mohs |
| Specific Gravity: | 1.8-2.5 |
| Bulk Density: | 400-900 kg/m³ |
| Color Index: | Leucocratic with mostly light-colored minerals |
| Color | Shades of grey, yellow, pale to deep red |

TABLE 2

Comparative study of bulk chemical analysis of pumice, fly ash (class F) and API cements A and G

| | Pumice | Fly Ash | Cement A | Cement G |
| --- | --- | --- | --- | --- |
| $SiO_2$ | 68.1 | 60.3 | 20.5 | 20.4 |
| $Al_2O_3$ | 15.0 | 21.4 | 4.00 | 4.44 |
| $Fe_2O_3$ | 3.09 | 4.63 | 4.56 | 4.46 |
| MgO | 1.19 | — | 3.59 | 3.46 |
| CaO | 2.71 | 6.10 | 62.1 | 61.4 |
| $Na_2O$ | 4.39 | 2.53 | 0.27 | 0.30 |
| $K_2O$ | 2.28 | 1.07 | 0.45 | 0.46 |
| $TiO_2$ | 0.34 | — | 0.16 | 0.15 |
| $P_2O_5$ | 0.14 | — | 0.03 | 0.03 |
| $SO_3$ | — | 0.16 | 2.05 | 2.87 |
| $Mn_2O_3$ | 0.06 | — | — | — |
| $Cr_2O_3$ | <0.01 | — | — | — |
| $V_2O_5$ | <0.01 | — | — | — |
| LOI | 2.90 | 0.43 | — | — |

Figure 2:
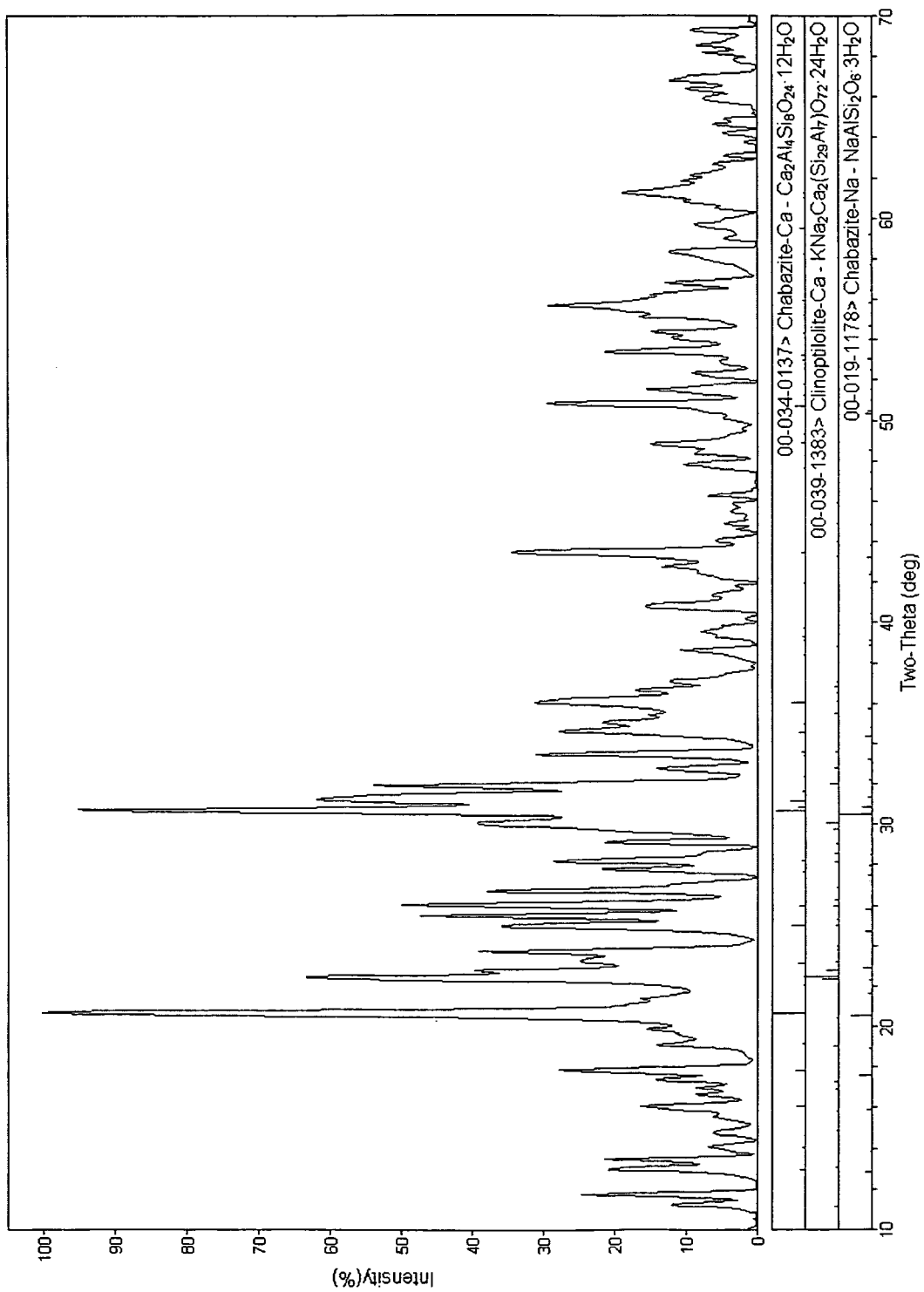
FIG. 2 shows a powder x-ray diffraction pattern of a natural zeolite sample with assignment of crystalline phases present.
Figure 3:
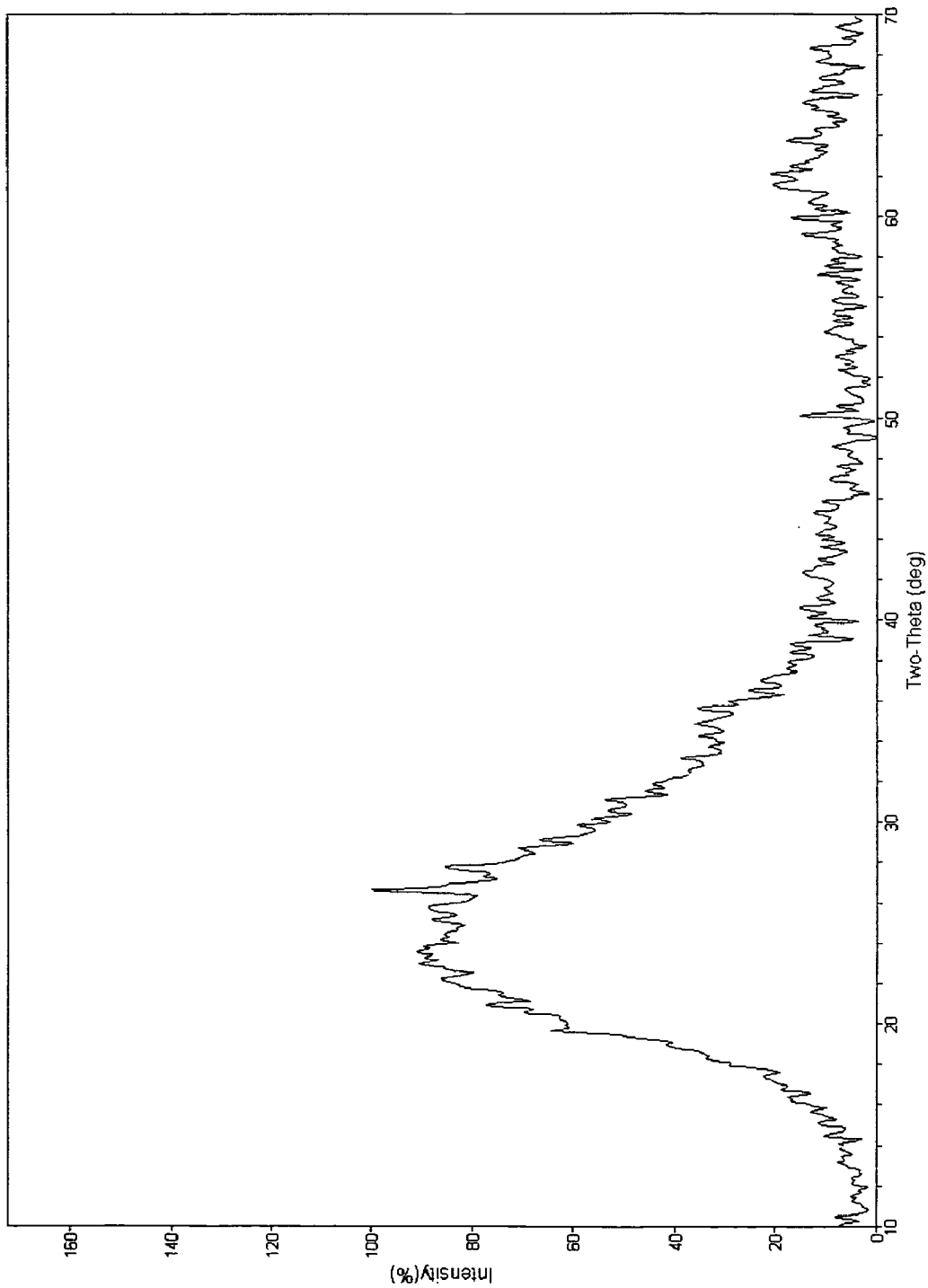
FIG. 3 shows a powder x-ray diffraction pattern of pumice sample indicating the amorphous nature of the material.

Pumice differs from zeolite, another reactive pozzolan, currently being used in oil well cementing applications, in that it is amorphous. X-ray diffraction analysis was carried out on zeolite and pumice (FIGS. 2 and 3 respectively) to contrast the amorphous nature of pumice with the highly crystalline nature of natural zeolites.

It has been discovered that cement compositions containing pumice show elastic and compressive strength properties that are particularly suitable for use in the formation of oil and gas wells. In particular, the use of pumice containing cement compositions is useful to reduce or prevent gas migration due to cement sheath failure. Various other additives can be added to the cement composition to further optimize the other desired properties of the composition. Surprisingly, the studies disclosed herein show that cement compositions containing pumice have improved properties for use in the manufacture of oil and gas wells.

The pumice may be added as finely ground or crushed particles and, in one embodiment, up to about 50% by weight or more. Preferably, the pumice is added up to about 40%, 30%, 25%, 20%, 15% or 10% by weight.

In one embodiment, the cement used is American Petroleum Institute ("API") Class A or Class G cement. As used herein, API Classes A and G cements are defined and described in Materials And Testing For Well Cements, API Specification 10, Fifth Edition, dated Jul. 1, 1990, of the American Petroleum Institute. In one embodiment, the cement may be mixed with fly ash in a ratio of about 100:0 to about 50:50 by weight, preferably about 80:20 and more preferably about 70:30. The pumice is finely divided and mixed with the cement-fly ash in a weight ratio of about 5:95 to about 100:0 of pumice to cement-fly ash (about 5% to about 100% pumice by weight). In a preferred embodiment, the pumice to cement-fly ash ratio is about 10:90 to about 30:70. In a more preferred embodiment, the pumice to cement-fly ash ratio is about 15:85 to about 25:75.

In one embodiment, the pumice comprises finely ground particles. The particle size of pumice may vary depending on the method used to crush or grind the material as well as the requirements of the end user. Generally, we have found that the smaller the particle size, the more effective the pumice is in creating a useful cement mixture. Without restriction to a theory, we believe reduced particle size increases the effective surface area of the particle, which allows more reactions with the cement particles to occur. Properties such as compressive strength, free water thickening time should improve, as well as the smaller particles will help reduce permeability by physically blocking the spaces between the cement particles to prevent fluid or gas migration through the system.

Once the pumice is crushed or ground down, the particle size range falls into a normal distribution. The majority of the particles will fall into a more narrow range and then there are outlying ranges of very fine particles down to 1 um and larger particles depending on the chosen grinding process. Preferably, but not necessarily, the larger end of the scale is screened down to a maximum allowable size as determined by the end user. This may shift the distribution curve to have a sharp curve on the larger size and a gentle sloping curve on the small side consistent with a creation of fines in the grinding process. In one embodiment, the particles will have a maximum screened particle size of 200 um, preferably 120 um, and more preferably about 100 um. In one embodiment, the particle size is screened to have a maximum size of about 80 um.

The cement composition may have a density of greater than about 1000 kg/m³ and less than about 2000 kg/m³. In preferred embodiments, the cement composition density may be about 1400 kg/m³ to about 1800 kg/m³. In alternative embodiments, the cement composition may comprise low-density compositions of less than about 1400 kg/m³, for example 1300, or 1200 or 1100 kg/m³. Low density cement compositions are preferred to protect certain portions of an oil and gas well, such as the lead, fill or non-producing sections of the wellbore. The primary reason for using low density cements is to reduce the hydrostatic pressure exerted on the formations due to the cement fluid column. The density of a cement composition may be lowered by the inclusion of low-density materials, such as glass spheres, silica fume, perilite, or diatomaceous earth.

Water is added to the cement composition in a suitable amount to make a slurry which is pumpable downhole. Any type of water can be used provided that it does not contain chemicals or contaminants that adversely affect the properties of the cement composition. In one embodiment, water is added in an amount from about 22 to 200% by weight of the cement composition, and more preferably from 40 to 100% by weight.

In one embodiment, the cement composition further contains additives in suitable amounts. In one preferred embodiment, the additives are present in the range of about 0.1-3.0% (wt). In another preferred embodiment, the additives are present in a range of about 0.5-1.5% (wt), more preferably, the additives are present in about 0.75-1.25% (wt). The additives may be used to alter the physical properties of the cement composition.

During the primary cementing process, it is desirable that the cement slurry composition set and develop sufficient compressive strength in as short a period of time as possible after placement thereof in order to avoid excessive delay in performing further well construction operations. Preferably this time, which is known as waiting-on-cement or simply WOC, does not exceed 24 hours. A number of commonly available accelerators were analyzed for use with cement compositions containing pumice at various densities including aluminum stearate, aluminum sulfate, calcium chloride, calcium formate, calcium hydroxide, calcium sulfate, lithium nitrate, magnesium oxide, hydrated lime, potassium carbonate, sodium aluminate, sodium carbonate, sodium formate, sodium metasilicate, sodium nitrate, sodium sulfate and sodium thiocyanate. It has been found that any of the above chemicals or their combinations may be used to control and accelerate the hydration rate of pumice containing blends. Accelerating additives may be used alone or in combination with one another. Accelerants may be added in a total amount of 0.5 to 12% by weight of blend (BWOB), and more preferably in a total amount of about 3 to 9% BWOB.

In some embodiments, fluid loss control additives may be added to provide effective fluid loss control to cement blends. Fluid loss control additives may comprise anionic or non-ionic water soluble polymers. Typical fluid loss additives include but are not limited to polyvinyl alcohol, cellulose derivatives, galactomanans, polyethylene imine and copolymers of quaternary ammonium or sulfonium chloride.

In another embodiment, dispersants may be added to the cement composition. Dispersants can be used to modify the rheological properties of the cement blend, and in some instances to control fluid loss. Typical dispersants include but are not limited to sodium salts of polynaphtalene or polymelamine sulfonic acid.

In another embodiment retarders may be added to prevent the early onset of cement thickening which would render the cement no longer pumpable. Typical retarders include but are not limited to sodium lignosulfonates.

There are usually guidelines set by governing bodies on the minimum compressive strength values for cement used for primary cementing of oil and gas wells. Most governing bodies state that the cement should have at least 3.50 MPa compressive strength in 48 hours time. This ensures the cement has enough strength to endure resuming well operations such as continued drilling, completions and other typical operations. However, compressive strength is not the only variable responsible for the cement successfully withstanding damaging well operations. A flexible system will allow the cement to absorb more energy before it is in a stressed state which could lead to cracking or failure. There are no regulatory minimum values for Young's Modulus. The combination of compressive strength and Young's Modulus can give an indication of the total energy the system can withstand before becoming stressed to failure.

Testing of elastic and compressible properties of cement compositions is known in the art. Young's Modulus is a measure of stiffness. It relates the elastic deformation of a material to the stress applied to the material. Young's Modulus allows the behavior of a material under load to be calculated. The following formula is used to calculate Young's Modulus.

$$E = \frac{\text{tensile stress}}{\text{tensile strain}} = \frac{\sigma}{\varepsilon} = \frac{F/A_O}{\Delta L/L_O} = \frac{FL_O}{A_O \Delta L}$$

where,
E is the Young's Modulus (modulus of elasticity) measured in pascals or psi
F is the force applied to the object
$A_O$ is the original cross-sectional area through which the force is applied
$\Delta L$ is the amount by which the length of the object changes
$L_O$ is the original length of the object The cement blends containing pumice of the present invention show sufficient compressive strength to meet regulatory requirements and surprising results where the ratio of compressive strength to Young's Modulus is considered. In one embodiment, the Young's Modulus of the cement blends is less than about 1700 MPa, preferably less than about 1600 MPa, and more preferably about 1500 MPa. The compressive strength of these blends is greater than about 5 MPa, preferably greater than about 6 MPa, and more preferably greater than about 9 MPa. In one embodiment, the CS:YM ratio is greater than about $5.0 \times 10^{-3}$, preferably greater than about $6.0 \times 10^{-3}$ and more preferably greater than about $7.0 \times 10^{-3}$.

Cement failures due to wellbore stresses is a major problem under certain conditions. One such condition is when lightweight cements are used in a long column to cover formations that are not known for producing hydrocarbons. The typical cements used here are lightweight through using high amounts of water or using lightweight materials in the mixture. These cements can be exposed to several stresses, changes in temperature or pressure in particular. These changes often cause the metal casing to expand or contract, and when they do they will expand or contract at different rates then the cement. This most often causes the cement sheath to be in a state of tensile stress, if a cement is not able to absorb some tensile energy and flex it can fail causing cracks or other damage to the cement column. This damage can lead to migration of fluids or gases from one formation zone to another, or even to the surface. To repair the damaged cement is costly and leads to suspended production and in extreme cases the well has to be abandoned. Therefore, a well designed lightweight cement is important to ensure zonal isolation for the life of the well. The pumice containing cement blends of the present invention may be used in lightweight cement having densities less than about 1400 kg/m³, while maintaining adequate strength and flexibility.

Without restriction to a theory, we believe this result is due to the combination of the chemical and physical properties of the pumice combined with cement. The mixture creates an end product that has more than sufficient compressive strength for a lightweight system. Typically a system with a high compressive strength will be stiff and have a high Young's Modulus. However, the low density pumice cement blends has shown high compressive strength while still maintaining a low Young's Modulus to maximize the performance benefits of the lightweight system.

Thickening time refers to length of time a cement slurry remains in a pumpable fluid state under simulated wellbore conditions of temperature and pressure, while compressive strength is an indicator of the force required to stress cement to complete failure. Pumice containing blends of the present invention have the desired thickening time for use in the field while still maintaining necessary compressive strength. It is often found that traditional low density blends (for example 1300 kg/m³) have very long thickening times which leads to concerns regarding invasion of formation fluids into the cement column. However, low density pumice containing blends have surprisingly quick thickening times. Therefore, the use of pumice in low density cement blends should allay concerns about fluid migration, a common problem when dealing with such low density cements.

When a cement slurry is allowed to stand for a period of time before setting, water may separate from the slurry, migrate toward and accumulate in pockets or at the top of cement column. This separation can impair zonal isolation and in deviated wells, it may cause gas migration. The pumice containing cement blends of the present invention display very small amounts of free-water at short or long thickening times.

Gas migration in an well is a complex phenomenon involving fluid density control, mud removal, cement slurry properties, cement hydration and interactions between the cement, casing and formation. Once slurry goes static, immediately after placement, it will start developing static gel strength (SGS) that will continue until the cement sets. SGS is developed due to the internally developed rigid network structure in the cement matrix that resists a force placed upon it. As gel strength increases, the cement column begins to partially support itself and to stop the volume reduction. This time is called the "transition time" and is defined as the time to reach static gel strength of 100 lb/100 ft² to 500 lb/100 ft². Optimum slurry design often requires short transition time, longer zero gel time (ZGT) and right angle set behavior. The ZGT is defined as the time it takes to reach SGS of 100 lb/100 ft² after the slurry becomes static. The pumice-cement blends of the present invention, even at relatively low densities, exhibit short transition times and fast setting behavior, which makes them suitable for cementing wells with potential immediate gas migration problems.

In one embodiment, the pumice containing cement blend has a transition time of less than about 15 minutes. Preferably, the cement has a transition time of less than about 12 minutes.

The following examples are intended to be illustrative, and not limiting of the claimed invention.

Example 1

For binary cement systems using API Class A or G cement, pumice is present in percent by weight of blend (BWOB). For example, for a blend of cement G+10% pumice, 90 g of cement G was mixed with 10 g of pumice to give a 100 g blend. All additive concentrations are calculated BWOB. In ternary cement systems, where cement, pumice and fly ash are used, the fly ash and pumice contents are also expressed by weight of blend. For example, for a 100 g blend of cement G+23.1% fly ash+23.1% pumice: 53.8 g cement G is added to 23.1 g fly ash and 23.1 g pumice. All additives concentrations are then given in % BWOB of total weight of solids present (cement+fly ash+pumice). Water is then added to make the desired slurry density.

Figure 4:
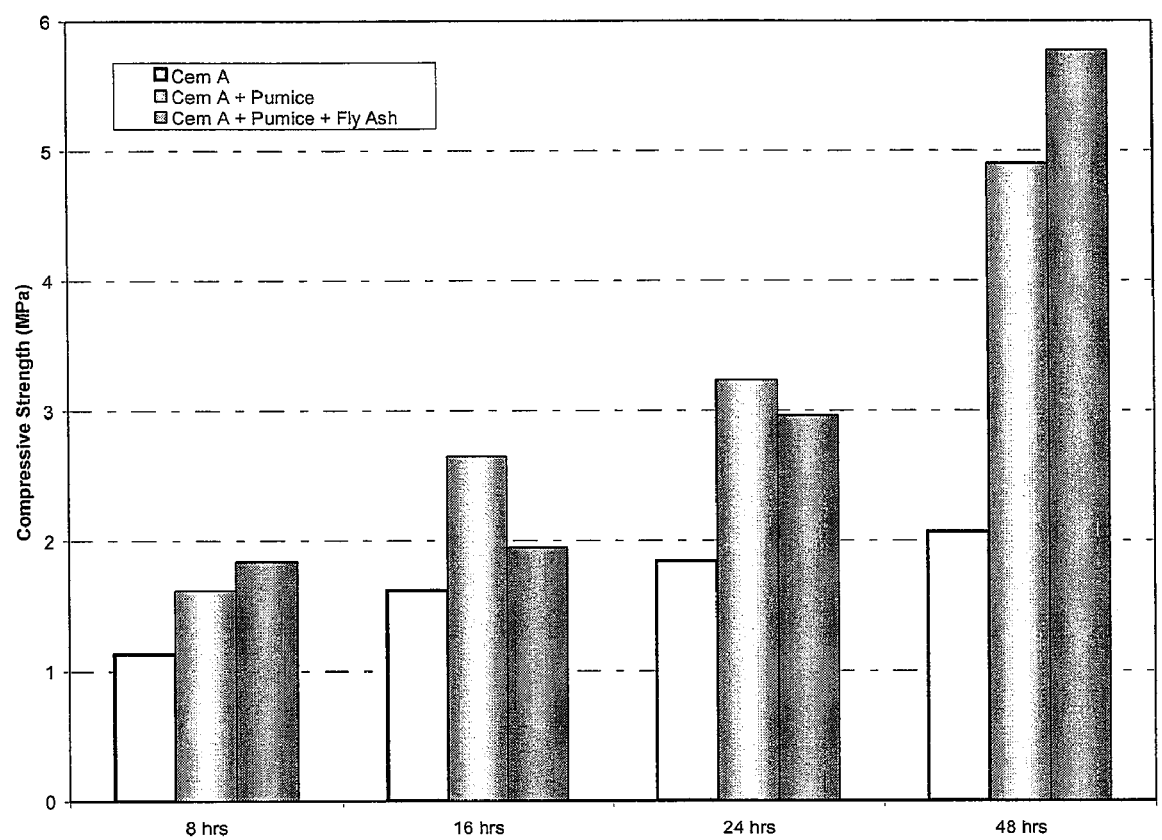
FIG. 4 shows a graph showing compressive strength data for 1400 kg/m³ cement A blends.
Figure 5:
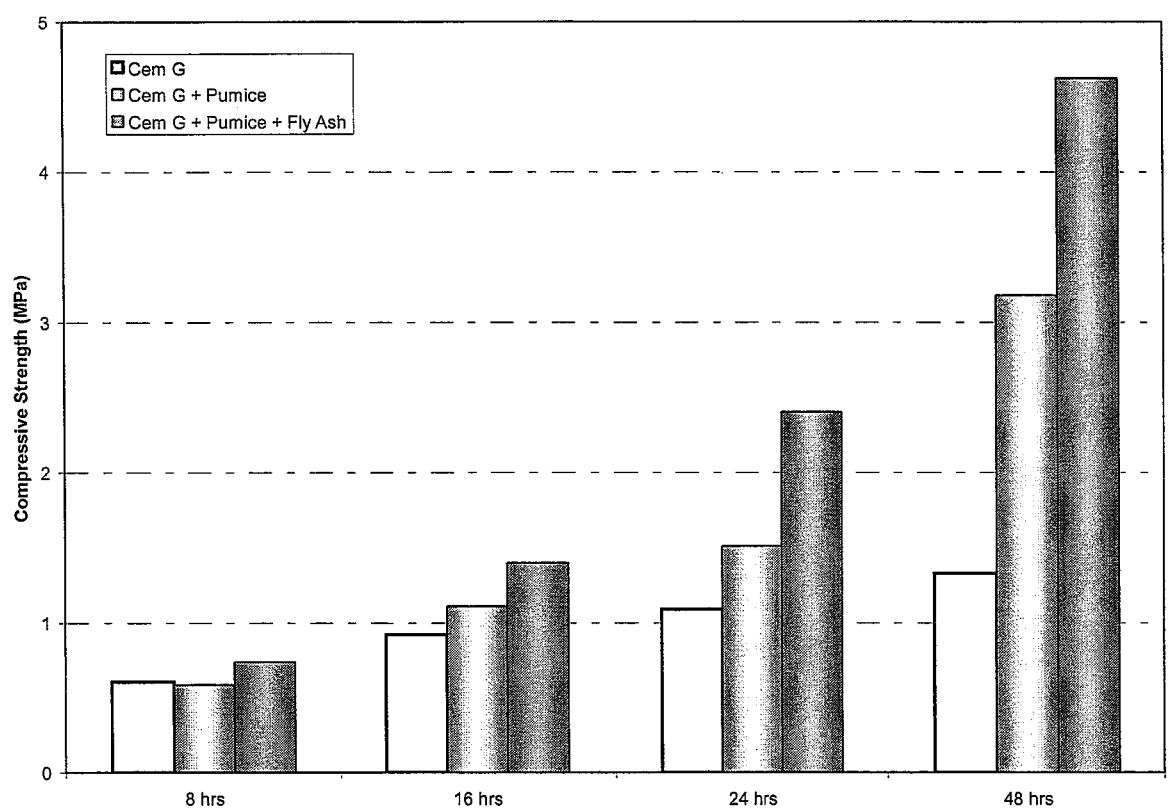
FIG. 5 shows a graph showing compressive strength data for 1400 kg/m³ cement G blends.

Compressive strength data from 8 to 48 hours for API Class A and G cement at densities of 1400, 1750 and 1900 kg/m³ are shown in Tables 3, 4 and 5 respectively. Graphical representations of the data are provided in FIGS. 4 and 5. Class A cement is generally used as construction grade cement and is typically more reactive than API Class G cement used in oil well applications. Compressive strength testing was carried out on either CTE Model 2000 or Chandler Model 4262 Twin ultrasonic cement analyzers according to API procedure 10B.

Regulatory authorities require that oilwell cement must reach a minimum compressive strength across zones of interest of 3.5 MPa after 48 hours. The following tables show the compressive strength of cement, cement/fly-ash and cement/fly-ash/pumice blends over 48 hours (cement is either API Class A or G). Compressive strengths are measured for 48 hours at some typical densities and at the appropriate temperatures.

TABLE 3

Compressive strength data for 1400 kg/m³ cement blends

| Blend | BHST °C. | Accelerators % BWOB | Compressive Strength (MPa) | | | |
|---|---|---|---|---|---|---|
| | | | 8 hrs | 16 hrs | 24 hrs | 48 hrs |
| Cem A | 50 | 3.3 | 1.13 | 1.62 | 1.84 | 2.07 |
| Cem A + P | 50 | 3.3 | 1.79 | 2.65 | 3.23 | 4.90 |
| Cem A + P + FA | 50 | 3.3 | 1.12 | 1.95 | 2.96 | 5.77 |
| Cem A | 70 | 3.3 | 2.24 | 2.92 | 3.23 | 5.77 |
| Cem A + P | 70 | 3.3 | 1.19 | 3.63 | 5.03 | 6.83 |
| Cem A + P + FA | 70 | 3.3 | 3.79 | 7.27 | 7.7 | 7.97 |
| Cem G | 50 | 3.3 | 0.61 | 0.92 | 1.09 | 1.33 |
| Cem G + P | 50 | 3.3 | 0.59 | 1.11 | 1.51 | 3.18 |
| Cem G + P + FA | 50 | 3.3 | 0.74 | 1.4 | 2.4 | 4.62 |
| Cem G | 70 | 3.3 | 1.22 | 1.46 | 1.53 | 1.58 |
| Cem G + P | 70 | 3.3 | 0.88 | 2.13 | 3.27 | 5.02 |
| Cem G + P + FA | 70 | 3.3 | 2.54 | 6.14 | 6.66 | 6.94 |

BHST = bottom hole static temperature
Cem A = API Class A cement
Cem G = API Class G cement
P = Pumice
FA = fly ash
Amounts added based on 100 g
Cem A = 100% or 100 g Cem A
Cem A + P = 30% Pumice i.e. 70 g Cem A + 30 g Pumice (Cement/pumice ratio = 0.428)
Cem A + (P + FA) = 23.1% Pumice, 23.1% fly ash i.e. 53.8 g Cem A + 23.1 g Pumice + 23.1 g fly ash (Cement/pumice or cement/fly ash ratio = 0.428)
Cem G = 100% or 100 g Cem G
Cem G + P = 30% Pumice i.e. 70 g Cem G + 30 g Pumice
Cem G + (P + FA) = 23.1% Pumice, 23.1% fly ash i.e. 53.8 g Cem G + 23.1 g Pumice + 23.1 g fly ash
Cem G + FA = 30% fly ash i.e. 70 g cem G + 30 g fly ash The results show that pumice blends meet the necessary requirements for compressive strength and that the pumice can be used to create a viable and useful cement blends. As shown, neat Cement A does not meet the compressive strength test at 50° C., but Cement A blended with pumice does. Also, neat Cement G does not meet the required strength at either temperature, but Cement G plus pumice at 70° C. does.

TABLE 4

Compressive strength data for 1750 kg/m³ cement blends

| Blend | BHST °C. | Accelerators % BWOB | Compressive Strength (MPa) | | | |
|---|---|---|---|---|---|---|
| | | | 8 hrs | 16 hrs | 24 hrs | 48 hrs |
| Cem A | 25 | 1.0 | 1.71 | 6.34 | 10.33 | 15.63 |
| Cem A + P | 25 | 1.0 | 2.86 | 9.43 | 13.36 | 18.56 |
| Cem A + P + FA | 25 | 1.0 | 3.26 | 10.75 | 15.29 | 20.96 |
| Cem A | 50 | 1.0 | 9.92 | 13.74 | 15.21 | 17.13 |
| Cem A + P | 50 | 1.0 | 12.28 | 16.82 | 19.79 | 25.90 |
| Cem A + P + FA | 50 | 1.0 | 15.43 | 22.38 | 27.26 | 30.58 |
| Cem G | 25 | 1.0 | 0.85 | 3.23 | 5.41 | 10.67 |
| Cem G + P | 25 | 1.0 | 1.06 | 4.21 | 8.18 | 14.58 |
| Cem G + P + FA | 25 | 1.0 | 1.97 | 6.39 | 10.56 | 18.08 |
| Cem G | 50 | 1.0 | 6.53 | 10.16 | 11.61 | 13.56 |
| Cem G + P | 50 | 1.0 | 9.27 | 14.58 | 17.51 | 24.02 |
| Cem G + P + FA | 50 | 1.0 | 12.04 | 19.63 | 25.08 | 27.95 |

TABLE 5

Compressive strength data for 1900 kg/m³ cement blends

| Blend | BHST °C. | Compressive Strength (MPa) | | | |
|---|---|---|---|---|---|
| | | 8 hrs | 16 hrs | 24 hrs | 48 hrs |
| Cem G | 25 | 1.23 | 5.28 | 9.05 | 17.31 |
| Cem G + 10% P | 25 | 2.64 | 8.46 | 13.59 | 23.23 |
| Cem G + 30% P | 25 | 4.55 | 13.3 | 20.61 | 30.90 |

These results show that the addition of pumice markedly improve the compressive strength of cements blends after 48 hours.

Example 2

Figure 6:
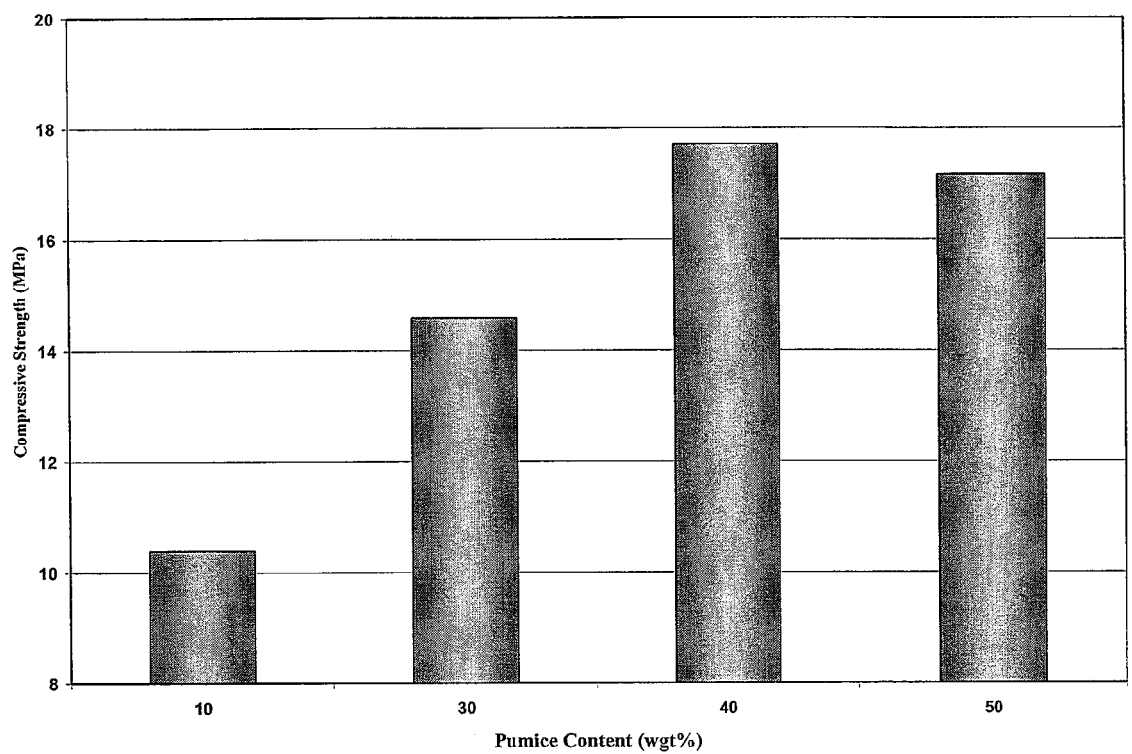
FIG. 6 shows a graph showing compressive strength data for 1750 kg/m³ cement G blends varying pumice content.
Figure 7:
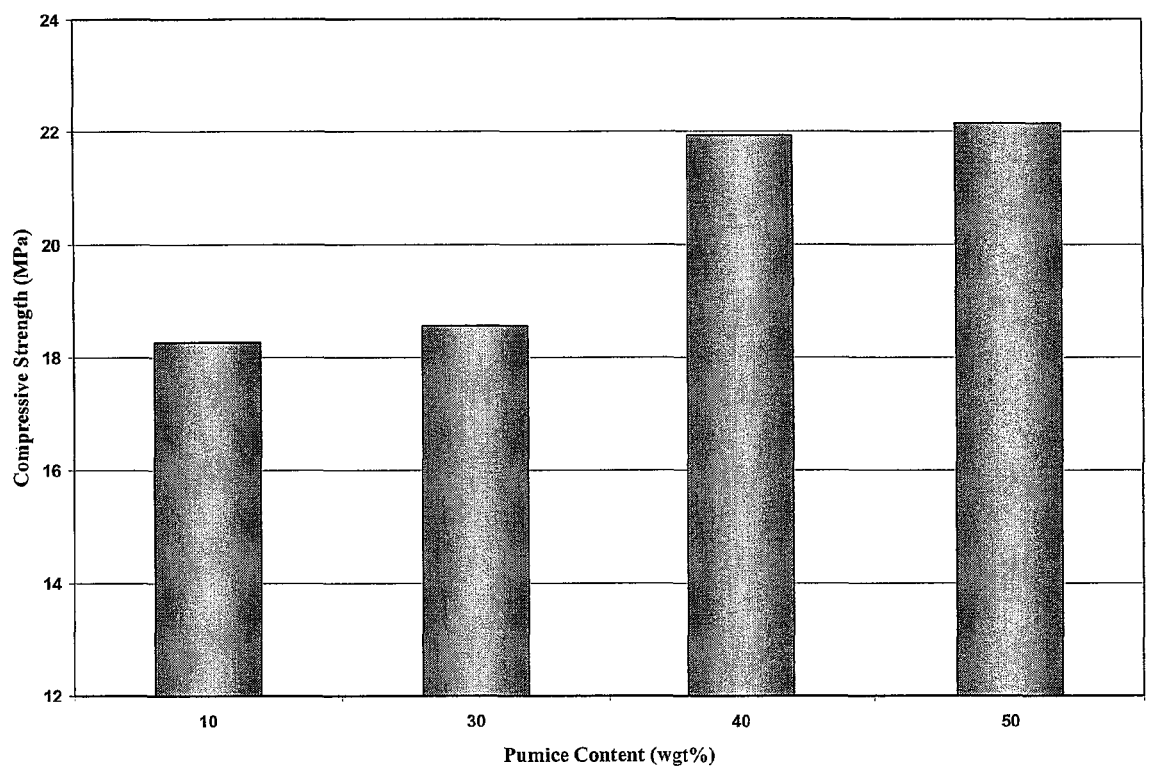
FIG. 7 shows a graph showing compressive strength data for 1750 kg/m³ cement A blends varying pumice content.

Compressive strength testing was carried out on API Class G (Table 6) and API Class A (Table 7) cement while varying the pumice content of the blend. The results show that pumice can be added to cement blends over a range of concentrations and still meet strength requirements. Graphical representations of the data are provided in FIGS. 6 and 7.

TABLE 6

Compressive strength data for API Class G cement varying pumice content

| Density kg/m³ | BHST °C. | Pumice % BWOB | Accelerator % BWOB | Compressive Strength (MPa) | | | |
|---|---|---|---|---|---|---|---|
| | | | | 8 Hrs | 16 Hrs | 24 Hrs | 48 Hrs |
| 1750 | 25 | 10 | 1.00 | 0.79 | 3.05 | 5.31 | 10.39 |
| 1750 | 25 | 30 | 1.00 | 1.06 | 4.21 | 8.18 | 14.58 |
| 1750 | 25 | 40 | 1.00 | 1.51 | 5.87 | 11.00 | 17.71 |
| 1750 | 25 | 50 | 1.00 | 1.67 | 6.46 | 11.40 | 17.16 |

TABLE 7

Compressive strength data for API Class A cement varying pumice content

| Density kg/m³ | BHST °C. | Pumice % BWOB | Accelerator % BWOB | Compressive Strength (MPa) | | | |
|---|---|---|---|---|---|---|---|
| | | | | 8 Hrs | 16 Hrs | 24 Hrs | 48 Hrs |
| 1750 | 25 | 10 | 1.00 | 2.13 | 8.18 | 12.53 | 18.26 |
| 1750 | 25 | 30 | 1.00 | 2.86 | 9.43 | 13.36 | 18.56 |
| 1750 | 25 | 40 | 1.00 | 3.95 | 12.05 | 15.84 | 21.93 |
| 1750 | 25 | 50 | 1.00 | 4.38 | 12.81 | 15.76 | 22.15 |

Example 3

Some compressive strength data are summarized in Table 8 where different accelerators were used in the cement blend.

TABLE 8

Compressive strength data for API Class A cement varying accelerator

| BHST °C. | Accelerator (1% BWOB) | Compressive Strength (MPa) | | | |
|---|---|---|---|---|---|
| | | 8 Hrs | 16 Hrs | 24 Hrs | 48 Hrs |
| 50 | None | 0.55 | 1.20 | 2.04 | 4.57 |
| 50 | CaSO₄ (anhydrous) | 0.98 | 1.19 | 2.58 | 5.18 |
| 50 | Sodium Sulfate | 1.55 | 2.35 | 3.31 | 6.34 |
| 50 | Calcium Hydroxide | 1.71 | 2.28 | 3.64 | 6.35 |

Class A cement + 23.1% fly ash and 23.1% pumice was used in all blends

Example 4

Figure 8:
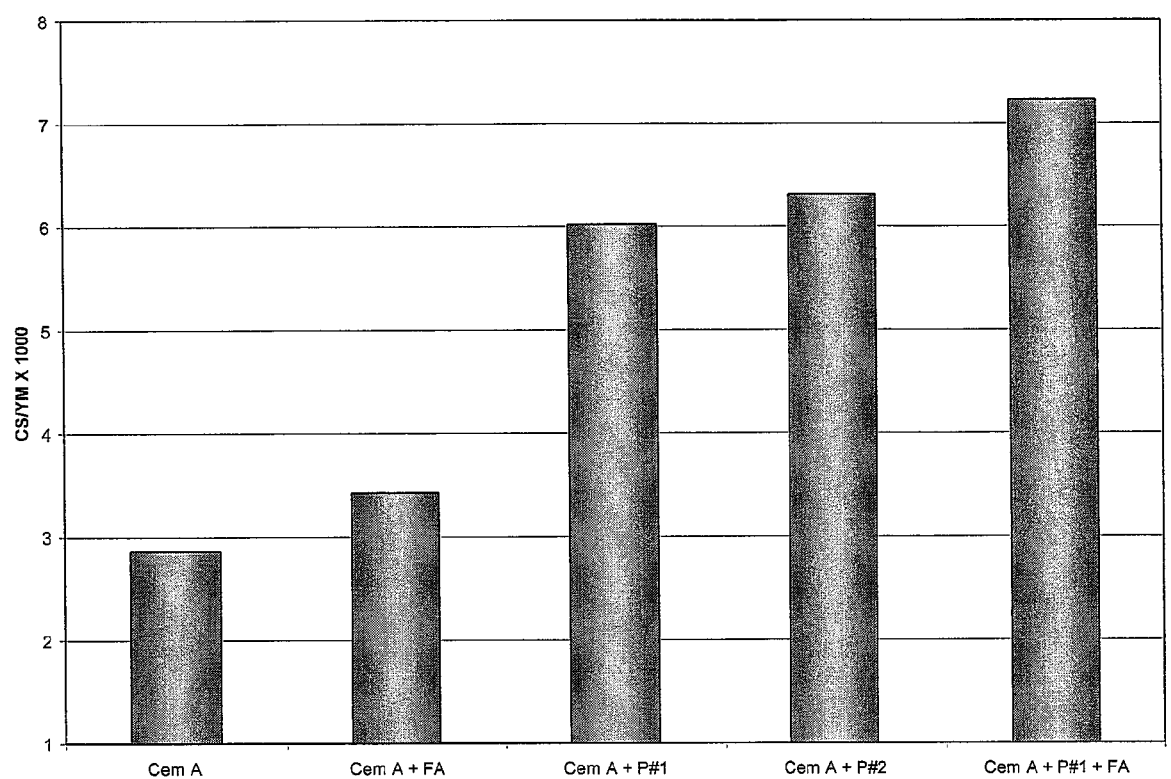
FIG. 8 shows a graph showing ratio of compressive strength to Young's Modulus for 1400 kg/m³ cement A blends.

The elasticity of pumice containing cement compositions having a density of 1400 kg/m³ were compared to other blends, and the effect of pumice particle size on elasticity was also evaluated (Table 9). Also shown in Table 9 is the compressive strength and flexural strength data for these blends. The ratio of compressive strength to Young's Modulus is shown in FIG. 8 for each blend. Flexural strength measurements were carried out on 4"×1"×1" rectangular prisms and were determined as per ASTM C293. Measurements were taken after the cement had been cured at 50° C. for 7 days.

TABLE 9

Young's modulus, compressive strength and flexural strength data for 1400 kg/m³ density blends

| Blend | Young's Modulus (MPa) | Compressive Strength (MPa) | Flexural Strength (MPa) | CS/YM × 1000 |
|---|---|---|---|---|
| Cem A | 765.32 | 2.19 | 1.6 | 2.862 |
| Cem A + 30% FA | 1951.21 | 6.69 | 2.2 | 3.429 |
| Cem A + 30% P#1 | 1509.95 | 9.09 | 2.3 | 6.020 |
| Cem A + 30% P#2 | 1634.06 | 10.31 | 3.1 | 6.309 |
| Cem A + 23.1% P#1 + 23.1% FA | 1544.43 | 11.16 | 2.8 | 7.226 |

All samples contain 3.25% accelerators BWOB
Cem A = API Class A cement
P#1 = Pumice sample no 3 (particle size 95% of particles less than 119.83 μm)
P#2 = Pumice sample no 1 (particle size 95% of particles less than 68.26 μm)
Cement/pumice and cement/fly ash ratio = 0.428 in all binary and ternary blends The lower the Young's Modulus, the more flexible the cement is i.e. the more it can deform without breaking. However, it is important not to optimize the Young's Modulus to the detriment of compressive strength or flexural strength. In one embodiment, the cement possesses high compressive strength with a relatively low Young's Modulus. The results in Table 9 show that cement blends containing pumice exhibit a sufficiently low Young's Modulus while still maintaining good compressive and flexural strength (compared to cement alone which has the desired low Young's Modulus but poor compressive and flexural strength).

It is clear from the data in Table 9 (FIG. 8) that the pumice containing blends have the highest compressive strength to Young's Modulus ratio compared to cement alone or the cement and fly ash blend. The finer ground pumice (P#2) possesses a Young's Modulus and flexural strength that is more desirable than the larger sized pumice (P#1).

Example 5

Data related to cement compositions containing pumice and having a density of 1300 and 1400 kg/m³ at different temperatures is shown in Tables 10 and 11. Thickening time refers to length of time a cement slurry remains in a pumpable fluid state under simulated wellbore conditions of temperature and pressure, while compressive strength is an indicator of the force required to stress cement to complete failure. It is shown in Table 10 that pumice containing blends have the desired thickening time for use in the field while still maintaining the necessary compressive strength. It is often found that traditional low density blends (for example 1300 kg/m³) have very long thickening times which leads to concerns regarding invasion of formation fluids into the cement column, however, as seen in Table 10, the low density pumice containing blends had surprisingly quick thickening times. Therefore, the use of pumice in low density cement blends should allay concerns about fluid migration, a common problem when dealing with such low density cements.

TABLE 10

Compressive strength and thickening time data for pumice-based cement compositions with density of 1300 kg/m³

| BHST | Additives % BWOB | | Thickening Time hr:min | | Compressive Strength (MPa) | | | |
| --- | --- | --- | --- | --- | --- | --- | --- | --- |
| ° C. | Accelerators | Retarder | 40 Bc | 100 Bc | 8 Hrs | 16 Hrs | 24 Hrs | 48 Hrs |
| 35 | 6.5 | 0.30 | 3:35 | 4:31 | 1.05 | 1.92 | 2.91 | 4.41 |
| 50 | 5.5 | 0.40 | 3:57 | 4:44 | 0.96 | 1.47 | 2.10 | 3.64 |
| 65 | 4.25 | — | 7:41 | — | 1.25 | 2.62 | 3.78 | 4.25 |

Class A cement + 19.6% fly ash + 32.7% pumice was used in all blends

When a slurry is allowed to stand for a period of time before setting, water may separate from the slurry, migrate toward and accumulate in pockets or at the top of cement column. This separation can impair zonal isolation and in deviated wells, it may cause gas migration. Therefore, experiments were done to measure free-water (or free-fluid) in pumice containing blends when various loadings of cement retarders are used. As shown in Table 11, all blends tested have only a very small amount of free-water at short or long thickening times.

TABLE 11

Thickening time and free water data for Pumice-based cement compositions

| Additives % BWOB | | Thickening Time (hh:mm) | | Free Water |
| --- | --- | --- | --- | --- |
| Accelerators | Retarder | 40 Bc | 100 Bc | (ml) |
| 3.3 | 0.00 | 1:44 | 2:03 | 0.1 |
| 3.3 | 0.30* | 1:48 | 2:06 | 0.1 |
| 3.3 | 0.40* | 2:31 | 2:46 | 0.0 |
| 3.3 | 0.50* | 3:06 | 3:23 | 0.0 |
| 3.3 | 0.30** | 3:57 | 4:25 | 0.1 |
| 3.3 | 0.35** | 5:02 | 5:30 | 0.1 |
| 3.3 | 0.40** | 8:08 | 8:32 | 0.1 |

Class A cement + 23.1% fly ash + 23.1% Pumice was used in all blends with density of 1400 kg/m³
All experiments are done at BHST of 50° C.
*Zinc oxide was used as cement retarder
**A sodium lingnosulfonate polymer was used as cement retarder

TABLE 12

Compressive strength data for some Pumice-based cement compositions.

| BHST | Accelerators | Compressive Strength (MPa) | | | |
| --- | --- | --- | --- | --- | --- |
| ° C. | % BWOB | 8 hrs | 16 hrs | 24 hrs | 48 hrs |
| 20 | 6.3% | 0.53 | 1.51 | 2.22 | 3.68 |
| 30 | 6.3% | 1.27 | 2.28 | 2.89 | 4.02 |
| 40 | 3.3% | 1.37 | 2.34 | 3.04 | 4.77 |
| 50 | 3.3% | 2.10 | 3.40 | 4.27 | 7.63 |
| 60 | 3.3% | 2.47 | 5.40 | 7.68 | 8.56 |
| 70 | 3.3% | 4.85 | 9.28 | 9.99 | 10.18 |

Class A cement plus 23.1% fly ash and 23.1% Pumice were used in all blends
All blends with density of 1400 kg/m³

As shown in the above tables, pumice-base cement compositions show very good gel-strength development even at densities of 1300 and 1400 kg/m³, as indicated by their short thickening times. They also offer early compressive strength development at lower temperatures.

Example 6

The exact rheology requirements for a preferred cement composition are job and situation specific. The effect of common dispersing agents on the rheology of Class G cement is given in Table 13. It has been found that these dispersing agents may be used to optimize viscosity of the cement blends containing pumice.

TABLE 13

Effect of dispersants on 1800 kg/m³ blend of API cement G and 30% pumice

| Dispersant 0.5% BWOB | BHST °C. | Accelerator % BWOB | 600 | 300 | 200 | RPM Readings 180 | 100 | 90 | 60 | 30 | 6 | 3 |
|---|---|---|---|---|---|---|---|---|---|---|---|---|
| — | 35 | 1 | 146 | 114 | 98 | 95 | 79 | 77 | 70 | 59 | 23 | 21 |
| R1 | 35 | 1 | 48 | 21 | 14 | 13 | 12 | 6 | 4 | 3 | 1 | 1 |
| R2 | 35 | 1 | 58 | 29 | 21 | 20 | 13 | 12 | 10 | 7 | 5 | 4 |

R1 = Sodium salt of polynaphtalene sulfonic acid
R2 = Sodium salt of polymelamine sulfonic acid Example 7

Ultra-lightweight cement blends were prepared containing hollow glass spheres (HGS5000™, 3M) in the amounts shown in Table 14. All blends were prepared using Class A cement, 23.1% fly ash and 23.1% pumice and cured in 2"×2"×2" cube molds in a high pressure curing chamber operating at temperature of 50 or 80° C. and pressure of 2000 psi. Compressive strength was measured using a crush test according to API RP 10B procedure are given in Table 14.

TABLE 14

Compressive strength and thickening time data for ultra-lightweight cement blends

| Density | Spheres % BWOB | Accelerator % BWOB | BHST °C. | Compressive Strength (MPa) 24 hrs | 48 hrs |
|---|---|---|---|---|---|
| 1200 | 25 | 3 | 50 | 2.9 | 4.9 |
| 1200 | 25 | 6 | 50 | — | 5.7 |
| 1100 | 44 | 6 | 80 | — | 5.2 |

As shown in Table 14, ultra-lightweight pumice containing blends can be prepared while maintaining adequate compressive strength.

Example 8

A Static Gel Strength Analyzer Model 5265 from Chandler Engineering with dual functionality was used to measure SGS and UCA from a single sample. As shown in Table 15, Pumice-cement blends with density of 1400 kg/m³ exhibit short transition times and fast setting behavior, which makes them suitable for cementing wells with potential immediate gas migration problems.

TABLE 15

Gel strength data of Pumice-cement blends with density of 1400 kg/m³.

| Additives (% BWOB) | Time to 100 lb/100 ft² (hh:mm) | Time to 500 lb/100 ft² (hh:mm) | Time to 1200 lb/100 ft² (hh:mm) | Transition Time (min) |
|---|---|---|---|---|
| None | 00:24 | 00:34 | 00:42 | 10 |
| 0.35% A1 | 00:50 | 01:00 | 01:10 | 10 |
| 0.35% R1 | 01:46 | 01:56 | 02:04 | 10 |
| 0.35% A1 + 0.35% R1 | 03:06 | 03:18 | 03:28 | 12 |

Class A cement + 23.1% fly ash + 23.1% pumice + 3% accelerators (BWOB) were used in all experiments
A1 = Free water control additive
R1 = cement retarding additive
All blends were at density of 1400 kg/m³ and BHST of 50° C.

REFERENCES

The following references are incorporated herein by reference, where permitted, as if reproduced herein in their entirety.

Serdar Aydin and Bülent Baradan, "Effect of pumice and fly ash incorporation on high temperature resistance of cement based mortars", Cement and Concrete Research, Volume 37, Issue 6, June 2007, Pages 988-995.

K. M. A. Hossain and M. Lachemi, "Performance of volcanic ash and pumice based blended cement concrete in mixed sulfate environment", Cement and Concrete Research, Volume 36, Issue 6, June 2006, Pages 1123-1133.

L. Gündüz and İ. Uğur, "The effects of different fine and coarse pumice aggregate/cement ratios on the structural concrete properties without using any admixtures", Cement and Concrete Research, Volume 35, Issue 9, September 2005, Pages 1859-1864.

Khandaker M. Anwar Hossain, "Volcanic ash and pumice as cement additives: pozzolanic, alkali-silica reaction and autoclave expansion characteristics", Cement and Concrete Research, Volume 35, Issue 6, June 2005, Pages 1141-1144

D. Sari and A. G. Pasamehmetoglu, "The effects of gradation and admixture on the pumice lightweight aggregate concrete", Cement and Concrete Research, Volume 35, Issue 5, May 2005, Pages 936-942

Habib Uysal, Ramazan Demirboa, Remzi ahin and Rüstem Gül, "The effects of different cement dosages, slumps, and pumice aggregate ratios on the thermal conductivity and density of concrete", Cement and Concrete Research, Volume 34, Issue 5, May 2004, Pages 845-848

Khandaker M. Anwar Hossain, "Properties of volcanic pumice based cement and lightweight concrete", Cement and Concrete Research, Volume 34, Issue 2, February 2004, Pages 283-291

Alaettin Kiliç, Cengiz Duran Ati, Ergül Yaar and Fatih Özcan, "High-strength lightweight concrete made with scoria aggregate containing mineral admixtures", Cement and Concrete Research, Volume 33, Issue 10, October 2003, Pages 1595-1599

Khandaker M. Anwar Hossain, "Blended cement using volcanic ash and pumice" Cement and Concrete Research, Volume 33, Issue 10, October 2003, Pages 1601-1605

Remzi ahin, Ramazan Demirboa, Habib Uysal and Rüstem Gül, "The effects of different cement dosages, slumps and pumice aggregate ratios on the compressive strength and densities of concrete", Cement and Concrete Research, Volume 33, Issue 8, August 2003, Pages 1245-1249

Ramazan Demirboa and Rüstem Gül, "The effects of expanded perlite aggregate, silica fume and fly ash on the thermal conductivity of lightweight concrete", Cement and Concrete Research, Volume 33, Issue 5, May 2003, Pages 723-727

Ramazan Demirboa, brahim Örüng and Rüstem Gül, "Effects of expanded perlite aggregate and mineral admixtures on the compressive strength of low-density concretes", Cement and Concrete Research, Volume 31, Issue 11, November 2001, Pages 1627-1632

R. Zimbelmann, "A method for strengthening the bond between cement stone and aggregates", Cement and Concrete Research, Volume 17, Issue 4, July 1987, Pages 651-660

G. L. Kalousek, L. C. Porter and E. J. Benton, "Concrete for long-time service in sulfate environment", Cement and Concrete Research, Volume 2, Issue 1, January 1972, Pages 79-89

The invention claimed is:

1. A cement composition for use in the manufacture of a subterranean well, the cement composition comprising:
   (a) about 5-100% (wt) of ground or crushed amorphous reactive pozzolan, of which the particle size has a range which falls into a normal distribution, screened to have a maximum particle size of about 200 μm such that the ground or crushed amorphous reactive pozzolan has particle sizes up to and including about 200 μm; and
   (b) about 0-95% (wt) of a mixture of American Petroleum Institute (API) Class A or Class G Portland cement and fly ash in a ratio of about 100:0 to about 50:50.

2. The cement composition of claim 1 wherein the amorphous reactive pozzolan comprises pumice.

3. The cement composition of claim 2 wherein the cement has a density of less than about 1400 kg/m$^3$.

4. The cement composition of claim 3 wherein the cement has a density of less than about 1300 kg/m$^3$.

5. The cement composition of claim 4 wherein the cement has a density of less than about 1200 kg/m$^3$.

6. The cement composition of claim 5 wherein the cement has a density of less than about 1100 kg/m$^3$.

7. The cement composition of claim 2 wherein the cement has a transition time of less than about 15 minutes.

8. The cement composition of claim 7 wherein the cement has a transition time of less than about 12 minutes.

9. The cement composition of claim 1 or 2 wherein the Portland cement comprises American Petroleum Institute (API) Class A cement.

10. The cement composition of claim 1 or 2 wherein the Portland cement comprises API Class G cement.

11. The cement composition of claim 2 wherein the cement has a compressive strength to Young's Modulus ratio of greater than about $5.0 \times 10^{-3}$, with a compressive strength of greater than about 3.5 MPa.

12. The cement composition of claim 2 wherein the ground or crushed pumice has a particle size range having a normal distribution up to and including about 120 μm.

13. The cement composition of claim 2 wherein the ground or crushed pumice has a particle size range having a normal distribution up to and including about 100 μm.

14. The cement composition of claim 2 wherein the ground or crushed pumice has a particle size range having a normal distribution up to and including about 80 μm.

15. The cement composition of claim 2 wherein the ground or crushed pumice has a particle size range having a normal distribution up to and including about 70 μm.

16. A method of cementing a subterranean well, comprising the steps of preparing the cement composition of claim 1, placing the cement composition in the well, allowing the cement composition to set.

17. The cement composition of claim 2, 12, 13, 14 or 15, wherein the cement composition comprises 10% to about 30% ground or crushed pumice.

* * * * *